(12) United States Patent
Chen

(10) Patent No.: US 7,404,831 B2
(45) Date of Patent: Jul. 29, 2008

(54) ABRASIVE COMPOSITE, METHOD FOR MAKING THE SAME, AND POLISHING APPARATUS USING THE SAME

(75) Inventor: Ga-Lane Chen, Fremont, CA (US)

(73) Assignee: Hon Hai Precision Industry Co., Ltd., Tu-Cheng, Taipei-Hsien (TW)

( * ) Notice: Subject to any disclaimer, the term of this patent is extended or adjusted under 35 U.S.C. 154(b) by 78 days.

(21) Appl. No.: 11/301,599

(22) Filed: Dec. 13, 2005

(65) Prior Publication Data

US 2006/0130409 A1 Jun. 22, 2006

(30) Foreign Application Priority Data

Dec. 16, 2004 (CN) .................... 2004 1 0077646

(51) Int. Cl.
*C09K 3/14* (2006.01)
(52) U.S. Cl. .................... 51/298; 51/300; 51/306; 51/308; 51/309; 106/3
(58) Field of Classification Search .................... 51/298
See application file for complete search history.

(56) References Cited

U.S. PATENT DOCUMENTS

| | | | | |
|---|---|---|---|---|
| 5,273,558 A | * | 12/1993 | Nelson et al. .................... 51/298 |
| 5,817,411 A | * | 10/1998 | Nakajima .................... 428/334 |
| 6,277,766 B1 | * | 8/2001 | Ayers .................... 438/778 |
| 2005/0008560 A1 | * | 1/2005 | Kataoka et al. .................... 423/445 R |
| 2005/0079354 A1 | * | 4/2005 | Iijima et al. .................... 428/408 |
| 2006/0165988 A1 | * | 7/2006 | Chiang et al. .................... 428/402.2 |
| 2007/0003753 A1 | * | 1/2007 | Asgari .................... 428/315.5 |
| 2007/0017160 A1 | * | 1/2007 | Caldwell et al. .................... 51/298 |

FOREIGN PATENT DOCUMENTS

JP 2004217828 A * 8/2004

* cited by examiner

*Primary Examiner*—J. A. Lorengo
*Assistant Examiner*—Shuangyi Abu-ali

(57) ABSTRACT

An abrasive composite, a method for making the abrasive composite, and a polishing apparatus using the abrasive composite are disclosed. The abrasive composite includes a matrix and a plurality of nano-particles distributed therein. The nano-particles are made of at least nano carbon sphere particles and fullerene particles. A ratio by weight of the nano carbon sphere particles to the fullerene particles is advantageously in the range from about 1:2 to about 1:1. The fullerenes are preferably $C_{60}$ fullerenes. The abrasive composite further includes an amount of diamond particles admixed in the matrix, for improving hardness of the abrasive composite so as to accelerate polishing rate. The abrasive composite is preferably in a form of pellets. The pellets have an average grain size in the range from about 10 nanometers to about 200 nanometers.

20 Claims, 2 Drawing Sheets providing a plurality of nano-particles made of at least nano carbon spheres and fullerenes

↓ distributing the nano-particles in a matrix, thereby forming an abrasive composite material

↓ forming the abrasive composite material into a plurality of pellets

ABRASIVE COMPOSITE, METHOD FOR MAKING THE SAME, AND POLISHING APPARATUS USING THE SAME

BACKGROUND

1. Technical Field

The present invention relates to polishing techniques and, particularly, to an abrasive composite for use in a polishing process/apparatus and a method for making the abrasive composite.

2. Discussion of the Related Art

Nowadays, a chemical mechanical polishing (hereinafter, CMP) has been widely used for polishing various elements such as semiconductor wafers, optical elements, and ceramic articles.

During a CMP process, outer portions of a workpiece are initially removed therefrom, due to a physical reaction, such as abrasion, and a chemical reaction, such as oxidation and/or chelation. As such, the surface of the workpiece is polished (i.e., smoothed). Typically, an abrasive composite is incorporated on and/or in a polishing faceplate capable of contacting the surface of the workpiece in order to achieve the removal of material and thereby smooth of the surface.

A conventional abrasive composite includes a binder (i.e., a matrix) and a number of abrasive particles distributed therein. The abrasive particles typically include ceramic particles having an average grain size in the range from 0.1 to 0.4 microns. At least 50 percent by weight of the ceramic particles are comprised of a material selected from alumina, ceria, silica, or a combination thereof. Nevertheless, the ceramic particles tend to have a lower wear resistance. In addition, the ceramic particles generally have irregular, roughened outer surfaces. Due to the irregular, roughened surfaces, the surface to be treated of the workpiece may potentially be scratched, thereby causing defects on the workpiece.

What is needed, therefore, is an abrasive composite that has excellent mechanical properties, has a high wear resistance, and is capable of minimizing the risk of scratching a surface of a workpiece.

What is also needed, therefore, is a polishing apparatus using that abrasive composite.

What is also needed, therefore, is a method for making that abrasive composite.

SUMMARY

In a preferred embodiment according to the present abrasive composite, an abrasive composite includes a matrix and a plurality of nano-particles distributed therein. The nano-particles include at least nano carbon spheres and fullerenes. A ratio by weight of the nano carbon spheres and the fullerenes is in the range from about 1:2 to about 1:1.

The abrasive composite is preferably in a form of pellets. The pellets have an average grain size in the range from about 10 nanometers to about 200 nanometers. The abrasive composite further includes an amount of diamond particles dispersed in the matrix. A ratio by weight of the diamond particles and the nano carbon spheres is in the range from about 1:2 to about 1:1.

The matrix is comprised of a polymer material and at least one of a hardener and a dispersant. The number of carbon atoms contained in each fullerene is not less than 20. The fullerenes preferably include $C_{60}$ fullerenes.

In another preferred embodiment, a method for making the above-described abrasive composite includes the steps of: (a) providing a plurality of nano-particles comprised of at least nano carbon spheres and fullerenes; and (b) distributing the nano-particles in a matrix to form an abrasive composite.

The method further includes the step of forming the abrasive composite into a plurality of pellets. The pellets may be formed, e.g., by a method selected from the group consisting of a mechanical ball milling method, a physical grinding method, and a supersonic grinding method.

In step (b), an amount of diamond particles are distributed in the matrix. The nano carbon spheres and the fullerenes are formed, for example, by a method selected from the group consisting of an arc discharge method, a chemical vapor deposition method, a thermal-enhanced chemical vapor deposition method, a plasma-enhanced chemical vapor deposition method, and a laser ablation method.

In a further preferred embodiment, a polishing apparatus includes an upper rotatable plate, a lower rotatable abrasive platform, a polishing faceplate, and a plurality of supporting pads. The lower rotatable abrasive platform is opposite from the upper rotatable plate. The polishing faceplate is attached on an underside of the upper rotatable plate. The polishing faceplate includes a metallic substrate and the above-described abrasive composite arranged thereon and/or therein. The supporting pads are disposed on the lower rotatable abrasive platform and are configured for supporting a workpiece.

The polishing apparatus further includes an integrated controlling device. The controlling device includes a plate controlling unit, a polishing slurry controlling unit, and a de-ionized water controlling unit. The polishing slurry advantageously includes nano carbon spheres, fullerenes, and metal oxide powders. The metal oxide is beneficially selected from the group consisting of aluminum oxide, cerium oxide, and a mixture thereof.

The abrasive composite includes nano-particles, such as the nano carbon spheres or the fullerenes. The nano carbon spheres and the fullerenes both can improve wear resistance and mechanical properties of the abrasive composite. In addition, the nano carbon spheres and the fullerenes also have substantially spherical structures and are good lubricants. Therefore, the abrasive composite is suitable to be used in polishing a workpiece without generally resulting in scratches. Accordingly, the polishing apparatus using the abrasive composite can polish the workpiece without the formation of scratches.

Other advantages and novel features of the embodiments will become more apparent from the following detailed description when taken in conjunction with the accompanying drawings.

BRIEF DESCRIPTION OF THE DRAWINGS

Many aspects of the present abrasive composite can be better understood with reference to the following drawings. The components in the drawings are not necessarily to scale, the emphasis instead being placed upon clearly illustrating the principles of the present abrasive composite. Moreover, in the drawings, like reference numerals designate corresponding parts throughout the several views.

DETAILED DESCRIPTION OF PREFERRED EMBODIMENTS

Embodiments of the present abrasive composite will now be described in detail below and with reference to the drawings.

Figures 1, 2:
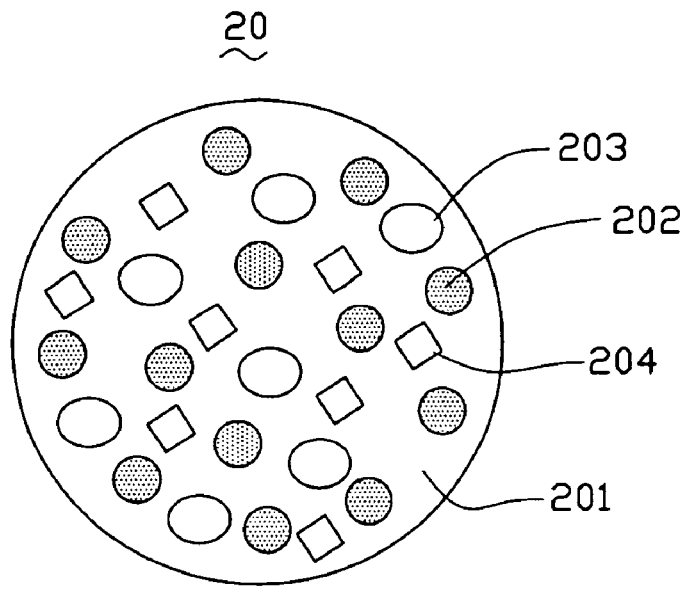
FIG. 1 is a schematic view of an abrasive composite in accordance with a preferred embodiment.
FIG. 2 is a flow chart of a method for making the abrasive composite of FIG. 1.

FIG. 1 illustrates an abrasive composite 20 in accordance with a preferred embodiment. Each abrasive composite 20 each includes a matrix 201 and a plurality of nano-particles 202, 203 dispersed therein. The nano-particles include at least nano carbon sphere particles 202 and fullerene particles 203. Alternatively, the nano-particles could be comprised of a combination of the nano carbon sphere particles 202 and the fullerene particles 203.

The matrix 201 is generally comprised of a polymer material, such as an epoxy resin, and additives such as a hardener and a dispersant. The nano carbon sphere particles 202 and the fullerene particles 203 are dispersed in the matrix 201. Preferably, the nano carbon sphere particles 202 and the fullerene particles 203 are uniformly distributed in the matrix 201. A ratio by weight of the nano carbon sphere particles 202 to the fullerene particles 203 is preferably in the range from about 1:2 to about 1:1.

Each nano carbon sphere (also referred to as a carbon nano capsule) is generally a polyhedral carbon cluster constructed of a plurality of concentric graphitic sheets, each having a closed spherical structure. The nano carbon sphere has a good wear resistance and excellent mechanical properties, similar to those of carbon nanotubes. The nano carbon sphere is substantially spherical in shape and therefore are suitable for use in polishing a workpiece to obtain a desired mirror-like surface with a low surface roughness associated therewith. The nano carbon sphere generally has an average diameter in the range from about 3 nanometers to about 100 nanometers. The nano carbon sphere is generally formed by a method selected from the group consisting of an arc discharge method, a chemical vapor deposition method, a thermal-enhanced chemical vapor deposition method, a plasma-enhanced chemical vapor deposition method, and a laser ablation method.

The fullerene is generally a spheroidal, closed-cage molecule having an $sp^2$ carbon network consisting of hexagons and pentagons. The fullerene has a good wear resistance and excellent mechanical properties, like carbon nanotubes. The fullerene may be of any type selected from a fullerene family. For example, the fullerene may be $C_{40}$, $C_{60}$, $C_{70}$, $C_{80}$, $C_{120}$, $C_{180}$, $C_{240}$, $C_{480}$, etc. However, the number of carbon atoms contained in a fullerene is generally not less than 20.

In the illustrated embodiment, the fullerene particles 203 are made of $C_{60}$ fullerenes (also referred to as Buckyball or Buckminsterfullerene). As a spheroid, the $C_{60}$ fullerene has an excellent wear resistance and is a good solid lubricant. The $C_{60}$ fullerene is therefore suitable for use in polishing the workpiece 15.

The abrasive composite 20 may further include a plurality of diamond particles 204. The diamond particles 204 are dispersed into the matrix 201 for improving hardness of the abrasive composite 20, thereby enhancing the polishing efficiency A ratio by weight of the diamond particles 204 to the nano carbon sphere particles 202 is in the range from about 1:2 to about 1:1. As such, a ratio by weight of the diamond particles 204 to the fullerene particles 202 is in the range from about 1:1 to about 4:1.

The abrasive composite 20 is preferably in a form of pellets. The pellets each have an average grain size in the range from about 10 nanometers to about 200 nanometers. The pellets are preferably substantially spherical in shape. Alternatively, the pellets could be ellipsoid or even have any other irregular, generally spherical shapes.

Referring to FIG. 2, a method for making the above-described abrasive composite includes the steps of: (a) providing a plurality of nano-particles made of at least nano carbon spheres and fullerenes; (b) distributing the nano-particles in a matrix, thereby forming an abrasive composite material; and (c) forming the abrasive composite material into a plurality of pellets.

In step (a), the nano carbon spheres and the fullerenes may be formed by a method selected from the group consisting of an arc discharge method, a chemical vapor deposition method, a thermal-enhanced chemical vapor deposition method, a plasma-enhanced chemical vapor deposition method, and a laser ablation method.

In step (b), a heating stirring step is advantageously performed for increasing a uniformity of the different components distributed in the matrix. The matrix is generally made of an epoxy resin, along with additives such as a hardener and/or a dispersant. Beneficially, a plurality of diamond particles is distributed in the matrix in order to improve the hardness and durability of the composite.

In addition, since the matrix contains a polymer material, the composite material is generally required to be subjected to a drying process or a cure process prior to forming the pellets.

Furthermore, the step (c) is an optional step. The pellets, if so formed, may be created, e.g., by a method selected from the group consisting of a mechanical ball milling method, a physical grinding method, or a supersonic grinding method.

Figure 3:
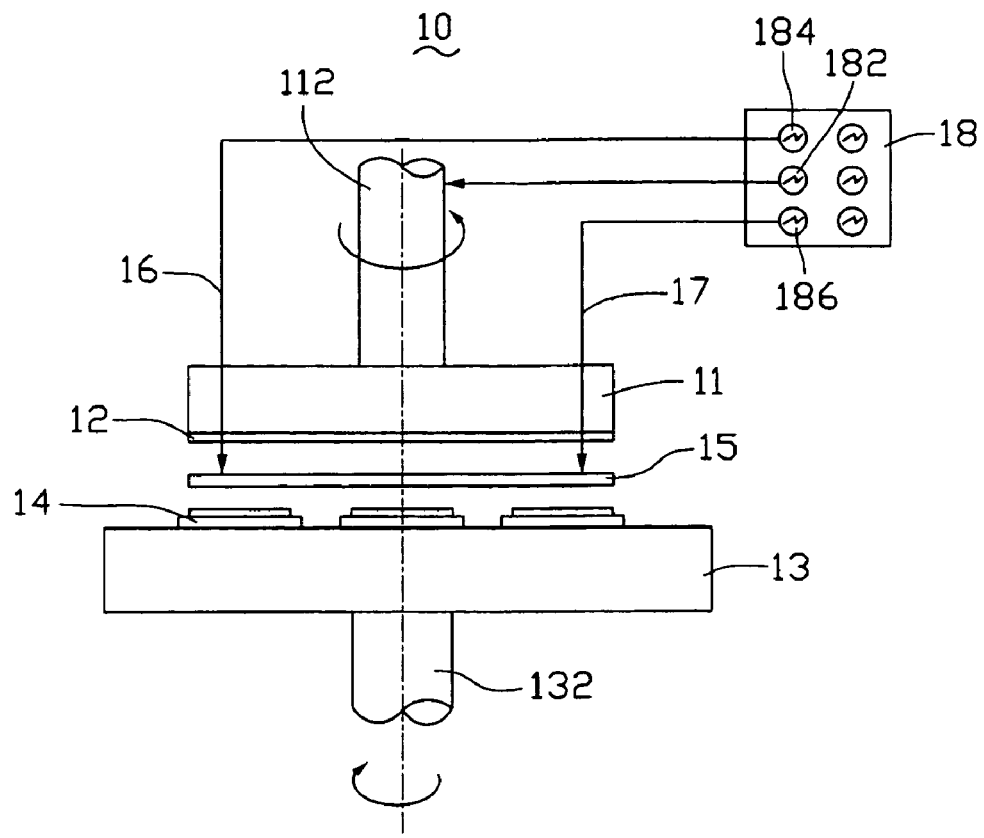
FIG. 3 is a schematic view of a polishing apparatus using the abrasive composite of FIG. 1.

FIG. 3 illustrates a polishing apparatus 10 using the above-described abrasive composite 20. The polishing apparatus 10 includes an upper rotatable plate 11, a lower rotatable abrasive platform 13, a polishing faceplate 12, and a plurality of supporting pads 14. The rotatable abrasive platform 13 is disposed opposite from the upper rotatable plate 11. The upper rotatable plate 11 and the rotatable abrasive platform 13 are fixed to an upper rotating axle 112 and a lower rotating axle 132, respectively. The upper and lower rotating axles 112 and 132 share a common central axis. The polishing faceplate 12 is preferably configured to be circular and is attached to an underside of the upper rotatable plate 11. The supporting pads 14 are disposed on the lower rotatable abrasive platform 13 for supporting a workpiece 15. It is understood, however, that it could prove useful to mount the polishing faceplate 12 to the topside of the lower rotatable platform 13, instead, in certain circumstances.

The polishing apparatus 10 further includes an integrated control device 18. The control device 18 includes a plate controlling unit 182, a de-ionized water controlling unit 184, and a polishing slurry controlling unit 186.

The plate controlling unit 182 is operatively associated with the upper rotating axle 112 and is configured for controlling movement of the upper rotatable plate 11, e.g. adjusting a rotating rate of the upper rotatable plate 11, selectively lifting or lowering the upper rotatable plate 11 relative to the rotating abrasive platform 13, and adjusting a pressure applied by the upper rotatable plate 11 onto the workpiece 15.

In operation, an amount of de-ionized water is generally supplied via a de-ionized water pipe 16 and is applied onto the workpiece 15. The de-ionized water controlling unit 184 is configured for controlling a flow rate of the de-ionized water.

As such, an amount of polishing slurry is generally supplied via a polishing slurry pipe 17 and then is applied onto the workpiece 15. The polishing slurry controlling unit 186 is configured for controlling a flow rate of the polishing slurry. The polishing slurry advantageously contains at least one of nano carbon spheres, fullerenes, and metal oxide powders therein. The metal oxide is advantageously selected from the group consisting of aluminum oxide, cerium oxide, and a mixture thereof.

Figure 4:
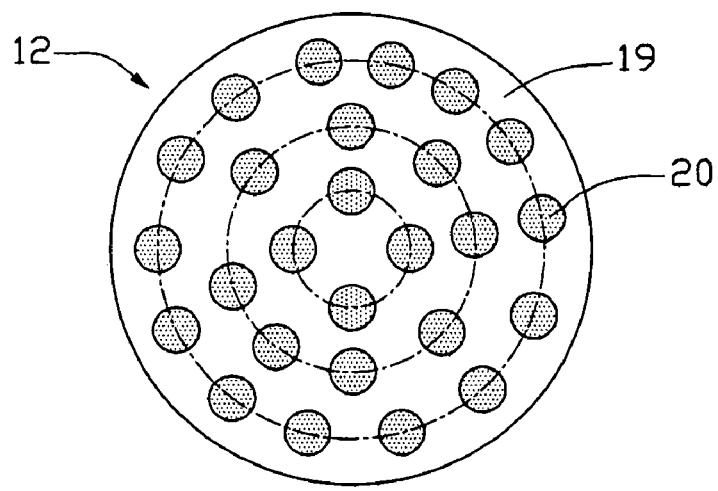
FIG. 4 is a schematic view of a polishing faceplate used in the polishing apparatus of FIG. 3, showing the arrangement of abrasive composite.

Referring to FIG. 4, the polishing faceplate 12 includes a metallic substrate 19 and a number of the above-described abrasive composite 20 provided thereon. The abrasive composite 20 is preferably in a form of pellets. The abrasive composite 20 is generally disposed on a surface of the metallic substrate 19 that faces the supporting pad 14 (see FIG. 3). Alternatively, the abrasive composite 20 could be at least partially embedded in the metallic substrate 19. The pellets of the abrasive composite 20 are preferably distributed on the polishing faceplate 12 along a plurality of imaginary concentric circles (shown with dashed lines in FIG. 4) relative to the rotation center of the polishing faceplate 12, for facilitating formation of a uniform smooth surface of the workpiece 15.

In operation, the polishing apparatus 10 can polish a number of workpieces 15 at a time. The workpieces 15 are placed on and thereby supported by at least one supporting pad 14. During the polishing process, the de-ionized water and the slurry are applied onto the polishing faceplate 12 by controlling the de-ionized water controlling unit 186 and the polishing slurry controlling unit 184, respectively The polishing faceplate 12 is moved downward toward the workpiece 15 by controlling the plate controlling unit 182 such that the workpiece 15 is squeezed between and by the polishing faceplate 12 and the rotatable abrasive platform 13. The upper rotatable plate 11 and the lower rotatable abrasive platform 13 are then rotated in opposite directions. The workpiece 15 is thereby polished under the combined action of the abrasive composite 20 and the polishing slurry. In the illustrated embodiment, the workpiece 15 is a glass element. The processed glass element may have a roughness in the range from about 0.2 nanometers to about 0.8 nanometers. It is to be understood that any of a variety of materials and/or components in which a highly polished surface is desired may be polished using the polishing apparatus 10.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An abrasive composite comprising:
   a matrix; and
   a plurality of nano-particles distributed therein, the nano-particles being comprised of nano carbon spheres and fullerenes, the nano carbon spheres each being polyhedral carbon cluster constructed of a plurality of concentric graphitic sheets, each of the concentric graphitic sheets having a closed spherical structure.

2. The abrasive composite of claim 1, wherein the number of carbon atoms contained in a fullerene is not less than 20.

3. The abrasive composite of claim 1, wherein the matrix is comprised of a polymer material and at least one of a hardener and a dispersant.

4. The abrasive composite of claim 1, wherein the abrasive composite in a form of pellets have an average grain size in the range from about 10 nanometers to about 200 nanometers.

5. The abrasive composite of claim 1, wherein a ratio by weight of the nano carbon spheres to the fullerenes is in the range from about 1:2 to about 1:1.

6. The abrasive composite of claim 1, further comprising a plurality of diamond particles distributed in the matrix.

7. The abrasive composite of claim 6, wherein a ratio by weight of the diamond particles and the nano carbon spheres is in the range from about 1:2 to about 1:1.

8. A method for making an abrasive composite, comprising the steps of:
   providing a plurality of nano-particles comprised of nano carbon spheres and fullerenes, the nano carbon spheres each being a polyhedral carbon cluster constructed of a plurality of concentric graphitic sheets, each of the concentric graphitic sheets having a closed spherical structure; and
   distributing the nano-particles in a matrix, thereby forming the abrasive composite.

9. The method of claim 8, further comprising the step of forming the abrasive composite into a plurality of pellets.

10. The method of claim 9, wherein the pellets are formed by a method selected from the group consisting of a mechanical ball milling method, a physical grinding method, and a supersonic grinding method.

11. The method of claim 8, wherein a plurality of diamond particles are admixed into the matrix, wherein a ratio by weight of the diamond particles and the nano carbon spheres is in the range from about 1:2 to about 1:1.

12. The method of claim 8, wherein at least one of the nano carbon spheres and the fullerenes are formed by a method selected from the group consisting of an arc discharge method, a chemical vapor deposition method, a thermal-enhanced chemical vapor deposition method, a plasma-enhanced chemical vapor deposition method, and a laser ablation method.

13. A polishing apparatus comprising:
   an upper rotatable plate; a lower rotatable abrasive platform disposed facing the upper rotatable plate; a polishing faceplate attached to an underside of the upper rotatable plate; and at least one supporting pad disposed on the lower abrasive platform, for supporting a workpiece; wherein the polishing faceplate comprises a metallic substrate and a plurality of abrasive pellets arranged at a surface of the metallic substrate that faces the supporting pad, each of the abrasive pellets being comprised of a matrix and a plurality of nano-particles distributed therein, the nano-particles being comprised of nano carbon spheres and fullerenes, wherein the nano carbon spheres each being a polyhedral carbon cluster constructed of a plurality of concentric graphitic sheets, each of the concentric graphitic sheets having a dosed spherical structure.

14. The polishing apparatus of claim 13, further comprising an integrated controlling device comprising a plate controlling unit, a polishing slurry controlling unit, and a de-ionized water controlling unit.

15. The polishing apparatus of claim 14, wherein the polishing slurry controlling unit provides a polishing slurry, the polishing slurry being comprised of at least one of nano carbon spheres, fullerenes, and metal oxide powders.

16. The polishing apparatus of claim 15, wherein the polishing slurry includes a metal oxide, the metal oxide being selected from the group consisting of aluminum oxide, cerium oxide, and a mixture thereof.

17. The polishing apparatus of claim 13, wherein the abrasive pellets are arranged on the polishing faceplate along a plurality of imaginary concentric circles.

18. The polishing apparatus of claim 13, wherein the abrasive pellets further comprise a plurality of diamond particles incorporated into the matrix.

19. The method of claim 9, wherein the plurality of pellets have an average grain size in the range from about 10 nanometers to about 200 nanometers.

20. The method of claim 8, wherein a ratio by weight of the nano carbon spheres to the fullerenes is in the range from about 1:2 to about 1:1.

* * * * *